Feb. 26, 1935.　　　R. L. TEMPLIN　　　1,992,555
CABLE VIBRATION INHIBITOR
Filed July 22, 1931
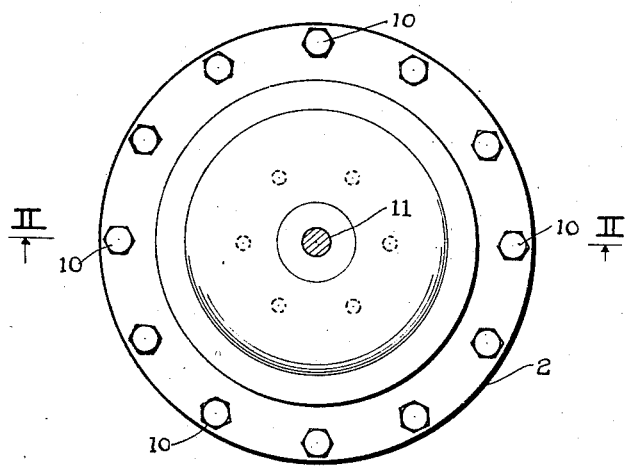
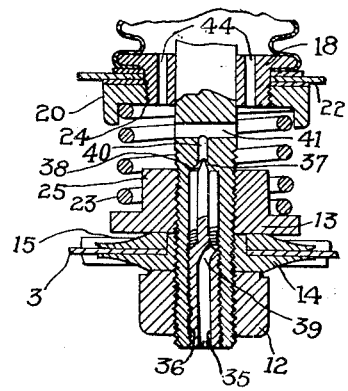
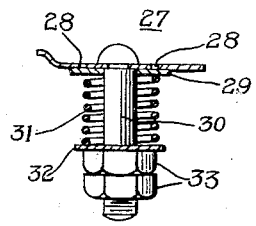
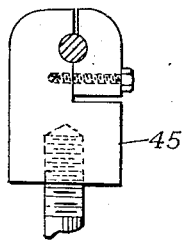
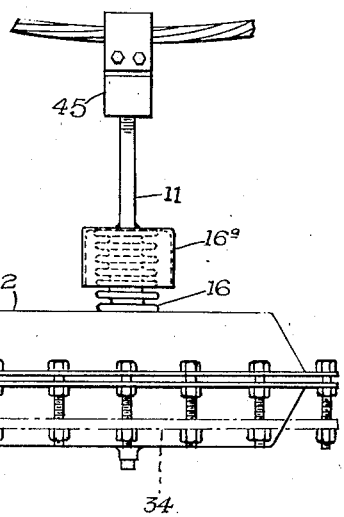
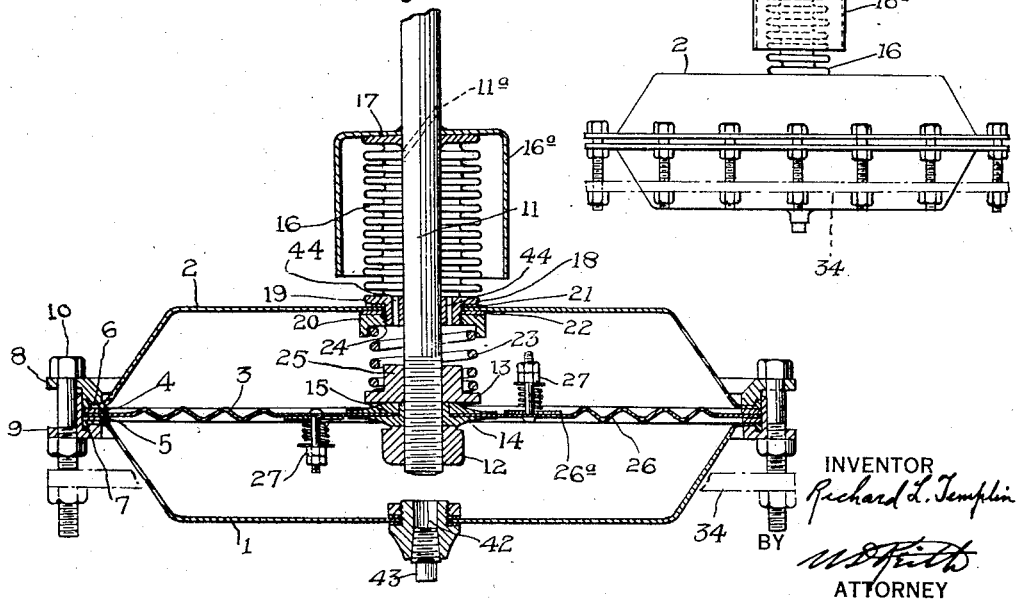
INVENTOR
Richard L. Templin
BY
ATTORNEY Patented Feb. 26, 1935

1,992,555

UNITED STATES PATENT OFFICE 1,992,555

CABLE VIBRATION INHIBITOR

Richard L. Templin, New Kensington, Pa., assignor to Aluminum Company of America, Pittsburgh, Pa., a corporation of Pennsylvania Application July 22, 1931, Serial No. 552,414

13 Claims. (Cl. 173—13)

This invention relates to means for inhibiting vibrations, oscillations or similar physical displacements in electrical transmission lines.

Vibrations or oscillations set up in aerial transmission lines by the action of air currents, temperature changes, etc. have a very detrimental effect on the line, causing premature breaks and fatigue failures particularly occurring at the points of fixation or support of the line.

An object of this invention is to provide a means which efficiently absorbs the energy produced by such oscillations or vibrations in aerial transmission lines, and neutralizes the effect of the periodic stresses resulting from these vibrations.

A further object of the invention is the provision of a vibration damping means of improved construction and operation, and permitting of a wide range of adjustment.

Other objects and advantages will be apparent from the following description of a preferred form of vibration damping mechanism embodying the principles of my invention as illustrated by the combination and arrangement of parts shown in the accompanying drawing.

In the drawing:

Fig. 1 represents a top plan view of my preferred form of a vibration damping mechanism;

Fig. 2 represents a sectional elevation taken on the line of II—II of Fig. 1;

Fig. 3 represents, to an enlarged scale, a vertical section through a valve in the diaphragm of the mechanism shown in Fig. 2;

Fig. 4 represents an alternative form of connecting link having an adjustable needle valve located therein;

Fig. 5 represents an exterior view of my preferred form of vibration damping mechanism as attached to an aerial transmission line.

Referring to the drawing, the vibration damping mechanism therein shown, is constructed in the form of a fluid-containing closed vessel provided with a centrally located diaphragm, dividing the vessel into two compartments. A connecting link attached to the diaphragm and extending exteriorly of the closed vessel through a suitable seal provides means for fastening the vibration damper to a transmission line. The fluid, such as oil or the like, contained in the closed vessel, is displaced from one side of the diaphragm to the other through the medium of suitable valves located in the diaphragm, as the diaphragm is displaced from its central position by reason of oscillations imparted thereto from the cable through the connecting link.

As shown to best advantage in Fig. 2, the apparatus comprises two superimposed shell-like vessels 1 and 2, between which is clamped a diaphragm 3. These shell-like members 1 and 2 have been shown as circular dished members but it is to be understood that they may be of any suitable form. Gaskets 4 and 5, arranged around the periphery of the flanges 6 and 7 of the superimposed shells 1 and 2, embrace the metallic diaphragm 3 therebetween, and clamping rings 8 and 9, together with fastening means 10, clamp the shells 1 and 2, the diaphragm 3 and the gaskets 4 and 5 together in sealed juxtaposition.

Centrally attached to the diaphragm 3, as by means of clamping nuts 12 and 13, and projecting vertically and upwardly through the top shell 2 is a connecting link 11, here shown in the form of a rod threaded at both ends. Interassociated washers 14 and 15 surrounding the link and disposed between the nuts 12 and 13 impart rigidity and strength to the flexible diaphragm 3 at its point of attachment to the connecting link 11. The link 11 is surrounded by a suitable sealing tube 16 which is preferably corrugated to permit flexing. This tube is attached at its upper end to the link 11 by means of a disk 17, welded or otherwise attached to the link, over which disk the end of the flexible tube 16 is rolled or otherwise securely attached. The lower end of the flexible tube is fixed by means of an externally threaded nut 18 loosely surrounding the link 11 and provided with a flange 19 over which the lower end of the flexible tubular member is rolled or otherwise attached. An internally threaded nut 20 on the interior of the shell 2 is threaded onto nut 18 and acts to draw the flexible sealing arrangement into clamping relationship with the shell member 2, suitable gaskets 21 and 22 being interposed between the exterior and interior surfaces of the shell 2 and the nuts 18 and 20 to insure a fluid-tight seal.

A protective hood or shield 16a may be provided surrounding the sealing tube 16 as a protection against unfavorable atmospheric conditions, such as the formation of ice, which would have a deleterious effect on the operation of the mechanism. This hood may be attached, to the disk 17, as by welding, and is adapted to depend vertically a suitable distance which will permit the maximum collapsing of the flexible sealing tube 16 without interference with the shell member 2.

Any suitable form of vent to the interior of my mechanism may be provided as shown by the diagonally drilled hole 11a through the connecting link 11. This vent is located above the maximum fluid level within the device, and its purpose will be readily appreciated hereinafter.

To insure the central location of the diaphragm 3 with respect to the shell members 1 and 2, in view of the dead weight of the vibration damping mechanism together with its weight of contained fluid, means may be provided in the form of a suitable compression spring 23. This compression spring 23 is disposed between the diaphragm 3 and the nut 20 and is centralized at its upper end by means of the cavity 24 in the nut 20 and at its lower end by means of the shoulder 25 formed integral with the nut 13. This arrangement of the diaphragm 3 and co-acting compression spring 23 insures the uniform displacement of the diaphragm on either side of a horizontal plane passing through the diaphragm in its neutral position and compensates for the dead weight of the cable damping mechanism.

While I have shown and described a form of my invention in which a compression spring 23 is interposed between the diaphragm and an inner surface of the container, it will be understood that the operativeness of the device will not be destroyed by the omission of the spring. It is, however, preferable to employ such a spring in order to compensate for the dead weight of the mechanism and its contained fluid as hereinbefore pointed out.

The diaphragm 3 is preferably formed with concentric corrugations 26 extending from the outside periphery inwardly towards its center where a flat surface 26a is provided. The corrugated form of diaphragm has been adopted to permit its flexing as it is displaced through the link 11 by the vibrations in the cable. However, it is possible and within the scope of my invention to employ some other suitably constructed diaphragm such at a flat plate mounted for relative movement with respect to the shell members 1 and 2. Within the flat surface 26a are disposed a plurality of adjustable valves 27. Referring to Fig. 3, these valves consist of a series of holes 28 over which disks 29 are centrally positioned by means of a suitable bolt or rivet 30, valve spring 31, washer 32, and lock nuts 33. These valves may be arranged, as shown, so that half their number open upwardly in a vertical direction against the springs 31 whereas the other half open downwardly in a vertical direction as the diaphragm is displaced from its central position, thus permitting the flow of fluid from one compartment to the other. Suitable holes 44 disposed in the nut 18 permit fluid to flow into the flexible sealing tube 16.

Provision is made for increasing the effective weight of the entire vibration damper mechanism in the form of an annulus 34 which is supported by means of the clamping bolts 10, a number of which extend some distance below the clamping ring 9 thus permitting the addition of more than one annulus, and making it possible and convenient to add sufficient dead weight to the mechanism to increase its effective vibration damping qualities.

In Fig. 4, an alternative form of connecting link 11 is shown. Replacing or cooperating with the valves 27, an adjustable needle valve is provided in intercommunication between the two compartments of the vibration damper mechanism. This needle valve is located in the lower end of the connecting link 11 and comprises a stem 35 disposed in a threaded hole 36 which terminates in a conical valve seat 37. The stem 35 is reduced in diameter towards the valve seat 37 and is provided with a conical valve closing portion 38 which acts in conjunction with valve seat 37 to vary the valve opening. A communication channel in the form of a by-pass 39 formed in the stem 35, and passages 40 and 41 in the bolt 11 permit the flow of fluid from one compartment to the other.

In the operation of my apparatus, the closed vessel is inverted and filled with a quantity of oil or other suitable fluid through an opening 42 in the lower shell 1, the fluid being permitted to flow from the lower compartment into the upper compartment, by suitably holding the valves 27 open as by pressure, or through the passages 39, 40 and 41 when the alternative form of connecting link 11 is employed. The quantity of fluid used is preferably sufficient to completely fill the apparatus when the flexible sealing tube 16 is compressed to the maximum extent. The opening 42 is provided with a suitable pipe plug 43 which affords a sealing device and also a means whereby the stem 35 of the needle valve may be adjusted. The vent 11a is suitably sealed during the fluid-filling operation in any suitable manner. The apparatus is now suspended from the cable, as shown in Figs. 2 and 5, by means of a threaded connection to any suitable form of attaching device 45 mounted on the cable.

Vibrations in the cable, to which my apparatus has been attached, resulting from wind or other conditions or sources, are transmitted to the diaphragm 3 through the link 11. Such action displaces the diaphragm from its normally central position, relative to the shells 1 and 2, and in so doing displaces the fluid within the apparatus from one compartment to the other through the valves 27 in the diaphragm, and through the needle valve in the link 11, when this particular form of link is employed. The construction of the valves 27 and the needle valve is such that the resistance to the passage of fluid therethrough may be regulated within reasonably wide limits. This wide range of adjustment makes it possible to greatly increase the efficiency of the device.

The passage of the fluid through the openings in valves 27, against the pressure exerted by the springs 31, absorbs the energy of the vibrations transmitted from the transmission line, and effectively eliminates the tendency of the transmission line to vibrate. Also the frictional resistance to fluid displacement presented by the passages 39, 40, and 41, and the degree of opening of the needle valve in link 11, likewise acts to absorb the energy of the vibrations.

In the actual operation of the vibration damping device, the vent 11a provides a constant atmospheric pressure within the apparatus. However, the absence of such a vent does not destroy the operation of the mechanism. In an apparatus of this general type in which there is no vent provided, the pressure within the mechanism is controlled by the amount of air enclosed in the system at the time of filling with fluid, it being understood that the mechanism is never completely filled with fluid. The pressure in such a closed system would vary in accordance with the deflection of the diaphragm and also with the temperature. With a vent to atmosphere, however, the pressure within the mechanism is constant regardless of the temperature, and the presence of the vent 11a permits the free expansion of the liquid within the system and further, acts in the capacity of a safety device against breaking pressures.

Having thus described and explained my invention and its mode of operation, it is to be understood that the apparatus described was selected merely for purposes of illustration and that numerous variations in the form and arrangement of parts shown and described herein may be made without departing from the nature and scope of my invention except as defined in the appended claims.

What I claim is:

1. A vibration damping device comprising shell members having concave sides facing one another to form a closed vessel, a flexible diaphragm centrally disposed between said shell members, a fluid passageway through said diaphragm, a link rigidly attached to said diaphragm and extending through an opening in one of said shell members, and a flexible seal surrounding said link and said opening.

2. A vibration damping device comprising a closed vessel divided into two fluid-filled compartments by means of a diaphragm, fluid escapement means in said diaphragm, a connecting element rigidly attached to said diaphragm and extending exteriorly of said closed vessel through a flexible seal attached to said element, and fluid escapement means in said connecting element.

3. A vibration damping device comprising a closed vessel divided into two compartments by means of a flexible diaphragm connected thereto, a fluid within said vessel, adjustable valves disposed in the diaphragm in communication with the two compartments, a connecting element rigidly secured to the diaphragm and extending exteriorly of the closed vessel through a flexible seal, and a vent to the atmosphere from the interior of said vessel above the fluid level therein.

4. A vibration damping device comprising a closed fluid-filled vessel divided into two compartments by means of a flexible diaphragm connected thereto, a fluid within said vessel, a valve in said diaphragm, a connecting element secured to the diaphragm and extending exteriorly of the closed vessel through a flexible seal, and a spring interposed between the diaphragm and an inner surface of the closed vessel to oppose upward movement of said diaphragm relative to said vessel.

5. A vibration damping device comprising a closed fluid-filled vessel divided into compartments by means of a diaphragm, communicating valves in said diaphragm, a connecting element attached to said diaphragm and extending exteriorly of said closed vessel through a flexible seal, and an adjustable needle valve in said connecting element to control the rate of transfer of fluid from one compartment to the other.

6. A vibration damping device comprising a closed fluid-filled vessel divided into compartments by means of a diaphragm, communicating valves located in said diaphragm, a connecting element attached to said diaphragm and extending exteriorly of said closed vessel through a flexible seal, a protective shield surrounding said flexible seal, an adjustable needle valve in intercommunication between the two compartments, and a loading means for increasing the effective weight of the device.

7. A vibration damping device comprising a closed fluid-filled vessel divided into compartments by means of a flexible corrugated diaphragm connected thereto, adjustable valves located in said diaphragm, a connecting link attached at one end to said diaphragm extending exteriorly of said closed vessel through a flexible seal and provided at its opposite end with means adapted for attachment to an aerial transmission line.

8. A vibration inhibitor comprising shell members disposed to form a closed cavity, an apertured flexible diaphragm disposed between said shell members, clamping rings associated therewith to draw the shell members and the diaphragm into clamping juxtaposition, a connecting element secured to said diaphragm and extending vertically through an opening in one of said shell members, and a corrugated flexible sealing member rigidly attached at one end to said connecting element and at the other end to one of said shell members.

9. A vibration inhibitor comprising a container divided into fluid-filled compartments by means of a flexible corrugated diaphragm capable of movement relative to said container, a connecting link attached to said corrugated diaphragm and extending exteriorly of said container, an exterior flexible sealing member rigidly attached at one end to said connecting link and at the other end to said container, and fluid escapement means adapted to be actuated by fluid pressure in said compartments.

10. A vibration inhibitor comprising a closed fluid-filled vessel divided into compartments by means of a flexible diaphragm, communicating valves in said diaphragm, a connecting link attached to said diaphragm and extending through an opening in said fluid-filled vessel, a flexible sealing member rigidly attached at one end to said connecting link and at the other end to said vessel, said flexible sealing member providing an overflow cavity for said fluid-filled vessel.

11. A vibration damper for transmission lines, comprising a container divided into fluid-filled compartments by a flexible corrugated diaphragm capable of movement relative to said container and connected thereto, fluid escapement means associated with said diaphragm and adapted to be operated by the pressure of the fluid contained in said compartments, and a member secured to said diaphragm and extending externally of said container through a flexible seal and adapted for attachment to a transmission line.

12. A vibration damper for transmission lines, comprising a container divided into fluid-filled compartments by a diaphragm capable of movement relative to said container and secured thereto at its edges, fluid escapement means associated with said diaphragm and adapted to be operated by the pressure of the fluid contained in said compartments, a member secured at one end to said diaphragm and extending through an opening in said container and adapted for attachment to a transmission line to support the damper, and a flexible seal surrounding said opening and a portion of the said member extending therethrough.

13. A vibration damper for transmission lines, comprising a container divided into fluid-filled compartments by a corrugated metal diaphragm capable of movement relative to said container and secured thereto at its edges, fluid escapement means associated with said diaphragm and adapted to permit passage of the fluid between the said compartments, a member secured at one end to said diaphragm and extending through an opening in said container and provided at the other end with means for attachment to a transmission line, whereby vibrations in the said line are transmitted to the said diaphragm, and a flexible seal surrounding said opening and a portion of said member and attached to said member.

RICHARD L. TEMPLIN.